March 1, 1960 I. GODIER 2,927,155
AMPLIFYING CIRCUITS HAVING AUTOMATIC GAIN CONTROL, ESPECIALLY FOR PICTURE SIGNALS IN TELEVISION RECEIVERS
Filed Aug. 16, 1954
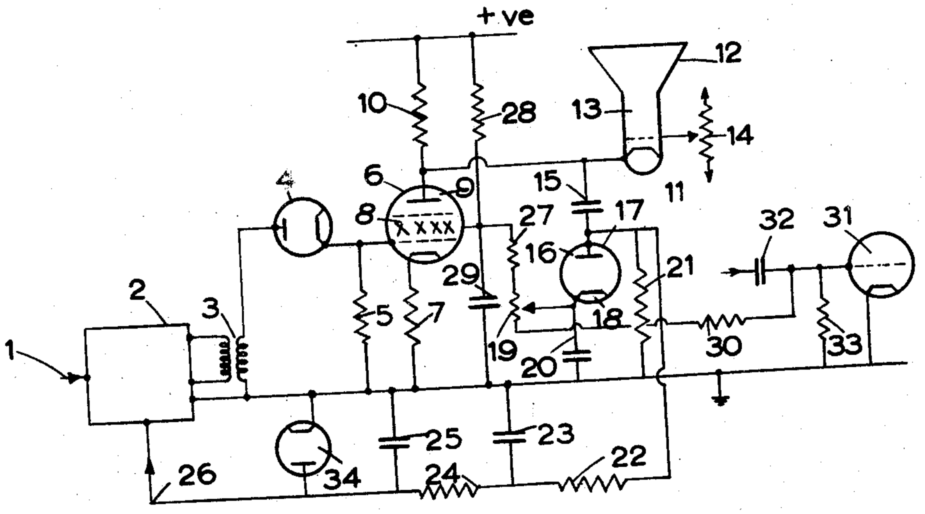
INVENTOR
I. Godier
BY
ATTORNEYS United States Patent Office 2,927,155

Patented Mar. 1, 1960

2,927,155

AMPLIFYING CIRCUITS HAVING AUTOMATIC GAIN CONTROL, ESPECIALLY FOR PICTURE SIGNALS IN TELEVISION RECEIVERS

Ivan Godier, Ealing, London, England, assignor to Electric & Musical Industries Limited, Middlesex, England, a company of Great Britain Application August 16, 1954, Serial No. 449,840

Claims priority, application Great Britain August 18, 1953

5 Claims. (Cl. 178—7.3)

This invention relates to amplifying circuits having automatic gain control especially for picture signals in television receivers.

Various proposals have been made for effecting control of picture signal amplitude in television receivers and according to one proposal the gain of an amplifying channel for the picture signals is controlled by a signal representative of the mean brightness of the picture signals, so that a compression of contrast is obtained in the receiver that is to say the signal is employed to reduce the gain of an amplifying channel for the picture signals from a relatively high gain which would otherwise prevail in the absence of said signal. Scenes of low mean brightness are thus reproduced with greater contrast and scenes of high mean brightness are reproduced with less contrast. In both instances the result tends, in the normal course of events, to afford a more pleasing picture. With the low mean brightness scene the increase in contrast enhances the detail; and the high mean brightness scene does not suffer from saturation in the white tones, as in practice is apt to be the case, due to the curvature of the reproducing characteristic in this region.

In an arrangement incorporating the proposal indicated the picture signals set up at the anode of a vision amplifier valve feeding the cathode of the reproducing cathode ray tube, are applied to a smoothing circuit to set up the signals representative of the brightness, after being applied to a circuit for levelling the signals relative to such a datum level that the signal representing the mean brightness may be fed directly to the control grids of the gain controlled valves of the amplifying channel to provide the required automatic gain control. In the absence of precautions to the contrary an arrangement of this kind encounters certain difficulties, one of which is connected with the delay in the automatic gain control circuit due to the necessary smoothing. Thus when the circuit is first switched on, and assuming that a transmission is present, the control grids of the gain controlled valves tend to be biassed to their most positive extent and to remain so while the condensers of the smoothing circuit are becoming charged negatively. During this time the vision channel tends to operate with maximum gain and an excessive signal tends to be applied to the vision amplifier valve so that this valve is heavily overloaded and the picture that is shown on the screen of the cathode ray tube is inverted or limited at a sensibly white raster devoid of modulation components.

Similar difficulty may arise in other amplifying circuits having automatic gain control and it is an object of the present invention to provide an arrangement in which this difficulty is reduced.

According to the present invention there is provided a television receiver having means for automatically controlling the picture signal amplitude by deriving a signal responsive to the brightness of the picture signals and employing said derived signal to reduce the gain of an amplifier for the picture signals from a relatively high gain which would otherwise prevail in the absence of said signal, and wherein means are provided for transiently reducing the gain of said amplifier on switching on the receiver during a period when the gain would otherwise tend to be excessive.

In arrangements where the signal responsive to the mean brightness of the picture signals is derived by smoothing the picture signals after levelling them relative to such a datum level that the derived signal can be applied directly to control the gain of said amplifier, said means for transiently reducing the gain of the amplifier preferably comprises mean for transiently varying said datum level.

In order that the invention may be more clearly understood and readily carried into effect it will now be described by way of example with reference to the single figure of the accompanying drawing.

In this figure, which shows in part the circuit layout of a broadcast television receiver, broadcast television signals including vision signals and sound signals received by a receiving aerial, not shown, are fed via a feeder 1 to an amplifier 2. After amplification by the amplifier 2 and possibly after a change of frequency in said amplifier the vision signals (which are still in the form of modulation on a carrier wave) are fed via a transformer 3 to a detector circuit comprising a diode 4 and load resistance 5. The detected signals appearing across the load resistance 5 are applied between the control grid and cathode of a vision amplifier valve 6, this valve including in its cathode circuit and in common with its control grid circuit a resistor 7 which serves to provide an appropriate bias for the valve 6, so that the valve amplifies more linearly. The valve includes a screening electrode 8 and an anode 9 and the amplified signals are developed across an anode load resistor 10 and applied to the cathode 11 of the picture reproducing cathode ray tube 12, the control grid 13 of which is connected to the slider of a potentiometer 14 so that the tube is appropriately biassed.

The amplified signals appearing at the anode 9 are also applied to a levelling circuit comprising primarily the capacitor 15 and the levelling diode 16 which functions to change the datum level of the signals appearing at the anode 9 so that the positive extremes of the signals appearing at the anode 17 of the diode 16 are aligned at a level determined by the potential to which the cathode 18 of the diode 16 is adjusted by means of the slider of the potentiometer 19. This level is such that normally the mean value of the signals is slightly negative with respect to ground potential. Said mean level is of course determined by the amplitude of said signals. The cathode 18 is effectively connected to ground for alternating currents by means of the by-pass condenser 20 and the resistance 21 constitutes a suitable leak resistor for the condenser 15.

The signals appearing at the anode 17 are in the sense such that synchronising signals extend positively and picture signals extend negatively. The tips of the synchronising signals are thus aligned sensibly at the potential of the cathode 18. Referring back to the amplifier 2, this amplifier is arranged so that its gain with respect to the vision signals fed to the transformer 3 can be automatically controlled and for this purpose the signals set up at the anode of the diode 16 are applied to a smoothing circuit consisting of first smoothing resistance 22 and condenser 23 and second smoothing resistance 24 and condenser 25. The smoothed potential set up across the condenser 25 represents the mean value (that is brightness) of the picture signals and provides the required gain control for the amplifier 2 being fed to said amplifier over the conductor 26.

As already indicated the smoothing circuit 22, 23, 24 and 25 necessarily operates with appreciable time delay and it will be realised that when the circuit is first brought into operation on switching on the receiver the gain of the amplifier 2, as determined by the signal fed over the conductor 26 will be a maximum in the positive direction even in the presence of received signals, and this condition will last for an appreciable time namely until the smoothing condenser 25 becomes charged up to its normal working condition. In this time, therefore, assuming the presence of received signals, signals of excessively large amplitude are likely to be applied by the detector circuit 4, 5 to the amplifier valve 6 and this valve is in consequence likely to be operated in a condition of considerable overload. The resultant signals appearing at the anode 9 of the valve tend to be strongly limited and to correspond sensibly to an uninterrupted white signal. In this form the signals are unsuitable to produce a useful gain control for the amplifier 2 so that the condition of overload tends to persist. In accordance with the invention and in order to reduce the time that it takes to charge the smoothing condenser 25 to such a level that normal operating conditions are approached, it is arranged to apply a transient negative potential of considerable magnitude to the cathode 18 of the diode 16 and thus via the diode to the smoothing circuit 22, 23, 24, 25. For this purpose, the positive end of the potentiometer 19 is connected via resistance 27 to the screening electrode 8 of the amplifying valve 6 and this electrode in turn is connected to the positive terminal of the source of high tension via the resistance 28 which is chosen so that in conditions of overload, and thus when the screening electrode 8 is drawing a heavy current, the potential that is applied to the electrode 8 falls considerably negative of the normal operating potential of the electrode. The condenser 29 serves to de-couple the electrode 8 and preferably its value is so chosen that its associated time constant is greater than the effective time constant of the gain control circuit of the amplifier 2. Upon the valve 6 becoming overloaded said condenser 29 commences to discharge via the screen-to-cathode path of the valve 6 and consequently the potential of the electrode 8 drifts negatively. This fall of potential is communicated via the resistance 27 to the cathode of the levelling diode 16 and thus sets up the required transient negative potential at the anode of the diode. The negative end of the potentiometer 19 may be connected to any suitable source of potential negative with respect to ground but, as shown in the figure, is connected via the resistance 30 to the control grid of a valve 31 which functions as the output valve of the line deflecting circuit (not otherwise shown in the drawings). This valve has driving signals applied to its control grid via a coupling condenser 32 such that current is drawn by the control grid, which automatically becomes biassed negatively. The negative bias so developed is employed to provide the negative potential to be applied to the negative end of the potentiometer 19. The resistance 33 serves as leak resistance for said control grid. Diode 34 prevents the gain control potential on conductor 26 from ever becoming positive with respect to earth and so causing overrunning of the gain controlled valves in the amplifier 2.

As aforesaid the invention may find application to other amplifying circuits having automatic gain control and wherein there is liable to be a failure of control on switching the circuit into operation.

I claim:

1. A television receiver comprising a gain controlled amplifier, means for levelling received picture signals relative to a datum level, means for deriving gain control signals from said levelled signals responsive to the brightness of the picture signals, means for applying said gain control signals to said amplifier and means for transiently varying said datum level on switching on said receiver to produce a gain control signal to reduce the gain of said amplifier during a period when the gain of the amplifier would otherwise be excessive.

2. A television receiver comprising a gain controlled amplifier, means for levelling received picture signals relative to a datum level, a smoothing circuit having a finite build-up period, means for feeding said levelled signals to said smoothing circuit to produce gain control signals responsive to the brightness of the picture signals, means for applying said gain control signals to said amplifier and means for transiently varying said datum level on switching on said receiver to produce a gain control signal to reduce the gain of said amplifier during said finite build-up period when the gain of said amplifier would otherwise be excessive.

3. A television receiver comprising a gain controlled amplifier, a levelling circuit including a unidirectionally conducting device for levelling received picture signals relative to a datum level, means for deriving gain controlled signals from said levelled signals responsive to the brightness of the picture signals, means for applying said gain control signals to said amplifier, means for deriving a bias voltage dependent on an overload condition and means for applying said bias voltage to said unidirectionally conducting device to transiently vary said datum level on switching on said receiver to produce a gain control signal to reduce the gain of said amplifier during a period when the gain of said amplifier would otherwise be excessive.

4. A television receiver comprising a gain controlled amplifier, a levelling circuit including a unidirectionally conducting device for levelling received picture signals relative to a datum level, a smoothing circuit having a finite build-up period, means for feeding said levelled signals to said smoothing circuit to produce gain control signals responsive to the brightness of the picture signals, means for applying said gain control signals to said amplifier, means for deriving a bias voltage dependent on an overload condition and means for applying said bias voltage to said unidirectionally conducting device to transiently vary said datum level on switching on said receiver to produce a gain control signal to reduce the gain of said amplifier during said finite build-up period when the gain of said amplifier would otherwise be excessive.

5. An amplifying circuit comprising a gain controlled amplifier, means for levelling received signals relative to a datum level, a smoothing circuit having a finite build-up period, means for feeding said levelled signals to said smoothing circuit to produce gain control signals responsive to the intensity of the amplified signals, means for applying said gain control signals to said amplifier and means for transiently varying said datum level on switching on said amplifier to produce a gain control signal to reduce the gain of said amplifier during said finite build-up period when the gain of said amplifier would otherwise be excessive.

References Cited in the file of this patent

UNITED STATES PATENTS 2,241,553 Kallmann et al. ---------- May 13, 1941
2,673,892 Richman --------------- Mar. 30, 1954
2,691,697 Adler ------------------ Oct. 12, 1954
2,735,002 Keizer et al. ------------ Feb. 14, 1956

FOREIGN PATENTS 641,949 Great Britain ----------- Aug. 23, 1950